United States Patent [19]

Plattner et al.

[11] 4,437,396
[45] Mar. 20, 1984

[54] AIR HEATED SANDWICH BIN

[75] Inventors: Robert F. Plattner, Spring Lake; Raymond J. Arend; John A. VerBerkmoes, both of Grand Haven, all of Mich.

[73] Assignee: Bastian Blessing Co., Inc., Grand Haven, Mich.

[21] Appl. No.: 425,430

[22] Filed: Sep. 28, 1982

[51] Int. Cl.$^3$ .................... A23B 4/04; B65G 55/00
[52] U.S. Cl. ...................... 99/475; 99/473; 99/483; 99/516; 219/400; 219/388
[58] Field of Search ............ 99/443 R, 473–478, 99/483, 516, 534, 536; 62/234, 256, 419; 98/36; 219/388, 399, 400

[56] References Cited
U.S. PATENT DOCUMENTS 3,942,426  3/1976  Binks et al. .................... 99/473

*Primary Examiner*—Timothy F. Simone
*Attorney, Agent, or Firm*—Sixbey, Friedman & Leedom

[57] ABSTRACT

A heated, moist air sandwich bin for maintaining sandwiches therewithin sufficiently moist and at preselected appropriately elevated temperatures comprising a front always open service opening through which sandwiches may be inserted into and/or removed from the bin. A bin floor divides the bin into an upper sandwich compartment and a lower compartment and defines with the side walls of the bin air flow passages for permitting air movement between the upper and lower compartments. Blower means in the lower compartment forces moisturized air over heaters and through a discharge nozzle extending substantially across the width of and below the service opening. Air directing vanes positioned at the service opening and extending into the upper compartment direct the flow of air discharging the nozzle away from the service opening to create and maintain a dome of hot, moist air over the sandwiches while creating turbulent zones outside the dome to minimize hot, moist air escape through the service openings.

20 Claims, 5 Drawing Figures

AIR HEATED SANDWICH BIN

DESCRIPTION

AIR HEATED SANDWICH BIN

1. Technical Field

The present invention relates to sandwich bins and, more particularly, to air heated sandwich bins for maintaining conventional-type sandwiches as well as other food products, such as pizza, chicken, etc., therein in a hot, moist condition.

2. Background Art

Many types of fast food restaurants prepare sandwiches, such as hamburger and sliced meat sandwiches, in advance of receiving orders from customers and must maintain these sandwiches in a ready-to-eat hot, moist appetizing condition until they are served. To accomplish this, fast food restaurants utilize heated sandwich bins for storing the sandwiches subsequent to preparation but prior to serving. One popular type sandwich bin utilizes radiant heat to maintain the sandwiches in ready-to-eat condition. However, radiantly heated bins have not proven altogether satisfactory since radiant heat tends to dry out the sandwiches and is readily lost through normally open sandwich insertion and removal openings in the bin. Moreover, accurate temperature control in radiantly heated bins has proven to be difficult. As a result a second type sandwich bin, which provides a continuously heated air curtain over the normally open sandwich insertion and removal openings and maintains a hot internal bin atomsphere without excessive movement therein, has become increasingly popular. A typical heated air curtain type sandwich bin is disclosed in U.S. Pat. No. 3,942,426-Binks et al.

The Binks et al patent discloses a sandwich bin comprising a housing including front, rear and side walls, a top and a bin floor, the front and rear walls defining always open service openings across the width of the bin for sandwich insertion and removal. Sandwich guiding means are provided for guiding rows of sandwiches from the rear service opening to the front service opening. Front and rear air blowers positioned below the bin floor and between the bin floor and a bin base force air over heaters and through associated ducts and discharge nozzles to provide air curtains across the entire width of the front and rear service openings. Air return chambers defined between a side wall and an inwardly spaced parallel inner wall which terminates below the top of the housing receive air from the air curtains and return the air under the bin floor to the blowers. The heated air streams across the service openings are intended to curtain the openings to prevent cool ambient air from flowing into the bin and passing over the sandwiches and to trap the hot internal atmosphere within the bin without substantial air movement over the sandwiches to minimize sandwich dessication. However, in practice, there is significant mixing of the heated air curtain with the ambient air and attendant substantial escape of heated air from the bin. There is also noticeable sandwich dessication caused by the dry hot air internal atmosphere and no effective provision is made for reversing or avoiding dessication. In addition, the provision of an elaborate air return structure, utilizing spaced apart double walls is expensive, unnecessary and impedes the attainment of a uniform heated air atmosphere within the bin.

It is therefore the purpose of the present invention to overcome the disadvantages and difficulties associated with known radiant heated and heated air curtain sandwich bins and to provide a thermally efficient, effective, simple and relatively inexpensive sandwich bin for maintaining prepared sandwiches hot and appropriately moist until needed.

DISCLOSURE OF THE INVENTION

In one aspect of the invention this is accomplished by providing a sandwich bin for maintaining sandwiches therewithin sufficiently moist at appropriately elevated temperature, including front and rear air discharge nozzles associated with air directing means for creating and maintaining a dome of heated air over the sandwiches to minimize heat loss therefrom.

In another aspect of the invention the sandwich bin includes humidifying means for creating and maintaining a dome of heated, moist air over the sandwiches to transmit and/or exchange heat and moisture therewith.

In a particularly preferred aspect of the invention the sandwich bin includes front, rear and side walls, a top and a floor, the front and/or rear walls defining an always open service opening substantially across the width of the walls through which sandwiches may be inserted into and removed from the bin. Sandwich support means extend substantially between the front and rear walls on or above the bin floor and below the service openings for storing sandwiches thereon within the bin while allowing access thereto through the service openings. The bin floor divides the bin into an upper sandwich storage compartment and a lower compartment and defines with the side walls air flow passages for permitting air movement between the upper and lower compartments. Front and rear blower means having air intakes and air discharges are positioned in the lower compartment with the discharge of the front and rear blower means in air flow communication with front and rear air discharge nozzles disposed substantially across the width of the front and rear walls below the service openings therein. Air heater means are disposed in the air flow path between each blower discharge and its respective nozzle for blowing a stream of air from the lower compartment over the heaters and through the nozzles into the upper compartment. Air directing means positioned at each service opening direct the flow of heated air discharging the nozzle away from the service opening into the interior of the upper compartment to create a dome of warm air over the sandwiches. In a particularly desirable form of the invention the blower intakes are in air flow communication with a source of humidified air for providing a dome of heated, moist air over the sandwiches.

BRIEF DESCRIPTION OF THE DRAWINGS

The invention will be better understood from the following description taken in conjunction with the accompanying drawings, in which.

BEST MODE FOR CARRYING OUT THE INVENTION

Figure 1:
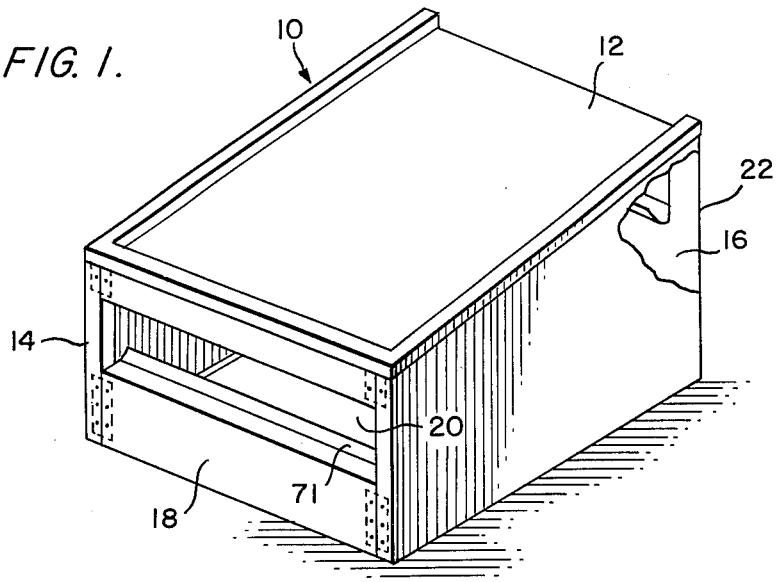
FIG. 1 is a perspective view of one form of a sandwich bin of the present invention having always open front and rear service openings.
Figure 2:
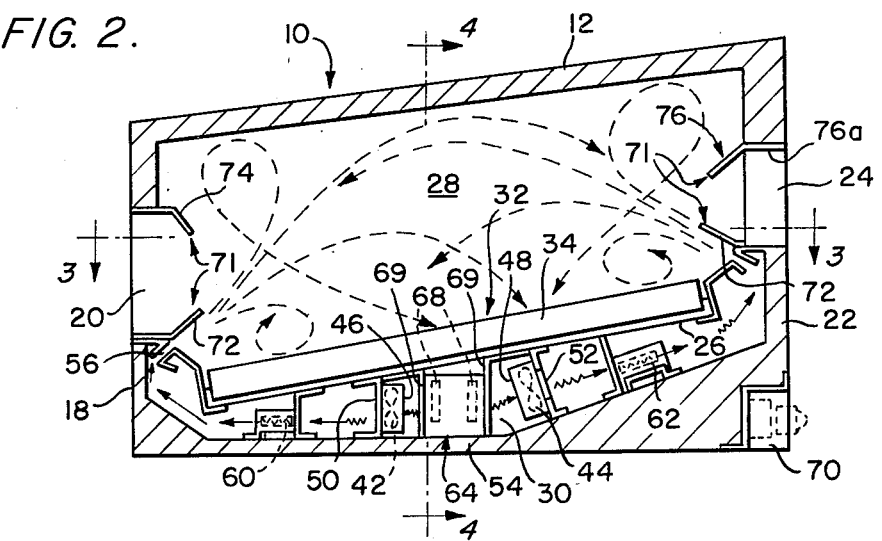
FIG. 2 is a longitudinal sectional view taken through the sandwich bin of FIG. 1.
Figure 3:
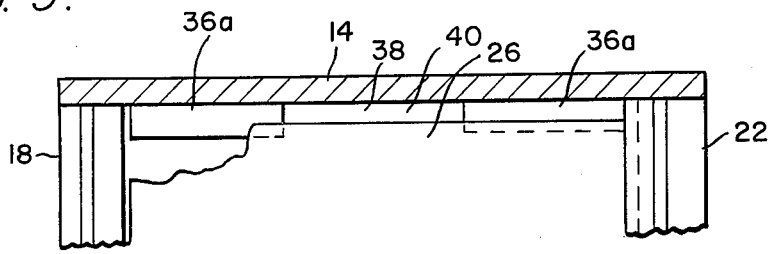
FIG. 3 is a fragmentary sectional view taken substantially along line 3—3 in FIG. 2.
Figure 4:
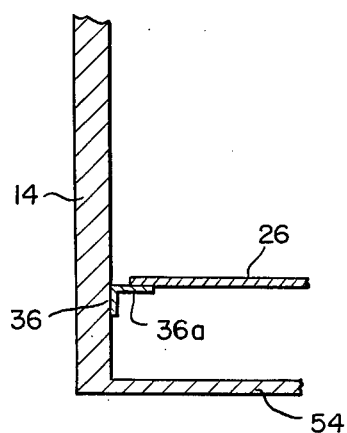
FIG. 4 is a fragmentary sectional view taken substantially along line 4—4 in FIG. 2.

Referring now to the drawings and particularly to FIGS. 1 and 2 the sandwich bin 10 of the present invention comprises an outer shell assembly including a preferably removable conventionally insulated top 12, generally parallel opposite sides 14,16, a front wall 18 defining a customer-side sandwich removal service opening 20 therein extending substantially across the width of front wall 18 between side walls 14,16, and a rear wall 22 defining an operator-side sandwich insertion service opening 24 therein extending substantially across the width of rear wall 22 between side walls 14,16. A removable bin floor 26 extends substantially between the front and rear walls 18,22 below the front and rear service openings 20,22 and between the side walls 14,16 for dividing the bin 10 into an upper sandwich compartment 28 and a lower compartment 30. Conventional sandwich support and guide means 32, such as generally U-shaped, open-topped sheet metal chutes 34, are supported on or above bin floor 26 below the service openings for storing, carrying and guiding sandwiches inserted therein through rear service opening 24 forward toward front service opening 20 for removal therethrough. At least two spaced apart bin floor support members, such as L-shaped brackets 36, are supported from each of side walls 14,16 for supporting bin floor 26 along its longitudinal edges. As can be seen most clearly in FIGS. 3 and 4, the longitudinal marginal edges of bin floor 26 resting upon the horizontially extending flange portion 36a of bracket 36 are spaced from side walls 14,16 to define with the gap 38 between the spaced apart support members air flow passages 40 for permitting air movement between the upper and lower compartments 28,30 of bin 10.

As is best illustrated in FIG. 2, lower compartment 30 comprises air ducting structure and houses air blowing, heating and humidifying means for producing a stream of heated, humidified air under pressure and for directing such a stream into the upper compartment 28 in a dome-like pattern, having turbulent vortices around the perimeter of the dome, in such a way as to envelope the sandwiches on support means 32 within the heated, humidified air dome while turburlent zones outside the dome in the upper compartment prevent heat and air loss through the front and rear service openings 20,24. Front and rear air blowers 42,44 having air intakes 46,48 and air discharges 50,52 are positioned within lower compartment 30 on bin base 54. Air drawn into blowers 42,44 through intakes 46,48 is forced through lower compartment 30 and via front and rear discharge nozzles 56,58, which extend across the width of and below front and rear service openings 20,24, into upper compartment 28. Due to the relative orientation of bin floor 26 and bin base 54, lower compartment air ducting structure generally tapers from front and rear air blowers 42,44 toward front and rear discharge nozzles 56,58 to increase the velocity of the air stream in passing through the lower compartment 30. Likewise, since the cross-sectional area of front and rear discharge nozzles 56,58 is substantially reduced relative to the cross-sectional area of the lower compartment ducting, the air stream is discharged into the upper compartment 28 at a relatively high velocity. Front and rear heater means 60,62, such as finned electric strip heaters, are provided in the lower compartment ducting between front and rear air blowers 42,44 and front and rear discharge nozzles 56,58 for increasing the air temperature of the air discharging from blowers 42,44. In conventional manner the operation of heater means 60,62 are controlled by suitable thermostat means (not shown) to provide the stream of air to the upper compartment at any desired temperature. When it is desired to provide a controlled humidity level stream of air to the upper compartment 28, lower compartment 30 may house and support on bin base 54 air humidifier means 64 having appropriate temperature and humidity controls (not shown) for operation at pre-selected temperature and humidity levels. In one desirable form, humidifier means 64 comprises a steam humidifier including a water pan or container 66 connected to an appropriate source of water (not shown) with the water level automatically maintained by a float control or other means (not shown) and having a pair of electrically operated immersion heaters 68 therein for heating and vaporizing the water in pan 66 to create the pre-selected humidity conditions for the air drawn into air intakes 46,48 of air blowers 42,44. Splash deflectors 69 prevent splash from pan 66 from contacting blowers 42,44. Operation of the immersion heaters 68 is controlled in conventional manner by suitable humidity sensors and/or thermostats (not shown).

Electrical power is provided to bin 10 via a suitable power supply. Provision is made for manual ON-OFF operation of the various system components, such as blowers, heaters, and the like, although automatic operation using conventional thermocouple and/or thermostatic sensors and appropriate controls is preferred. Appropriate indicator lamps and bin lighting is provided as needed in accordance with well known criteria and technology. For convenience, an externally accessible electrical raceway and component access opening 70 is provided for servicing and replacement of various system control components and circuitry.

INDUSTRIAL APPLICABILITY

In operation of the sandwich bin of the present invention for producing and providing a controlled stream of heated, humidified air under pressure to sandwiches supported on support and guide means 32, the immersion heaters 68 are activated to vaporize water from pan 66 to provide a humidified air source for drawing into front and rear air intakes 46,48 of front and rear blowers 42,44. The air discharged from the blowers is heated in passing over front and rear strip heaters 60,62 and accelerated in passing through front and rear discharge nozzles 56,58 to provide a relatively high velocity stream of heated, humidified air to upper compartment 28. Unlike conventional air curtain type sandwich bins which rely upon the stream of air issuing from the nozzles to curtain the service openings in what is, at best, a moderately successful effort to prevent the inflow of cool air and the outflow of hot air, the sandwich bin of the present invention provides air directing means 71 for controllably re-directing the stream of air issuing from the nozzles in a manner to create and maintain a dome of heated, moist air over the sandwiches for transmitting and/or exchanging heat and moisture therewith. The air directing means 71 positioned at each service opening 20,24 directs the flow of heated, moist air discharging from nozzles 56,58 generally away from the service openings into the interior of the upper compartment 28 to form the desired dome of heated, moist air while at the same time creating turbulent vortices around the perimeter of the dome. As can be most clearly seen in FIG. 2, zones of turbulent air are created in the corners of upper compartment 28 of bin 30 which have the effect of urging the moist, heated air stream inwardly away from the service openings 20,24 to minimize escape of the heated, moist air. In this way, more intimate contact between the heated, moist air and the sandwiches is achieved and heat losses through the service openings are minimized. The air directing means 71 of the present invention are preferably upper and lower air deflectors, baffles or vanes 72,74 projecting inwardly from and along the inner lower and upper margins of the service openings 20,24 and extending across the width of the service openings substantially co-extensively with the front and rear discharge nozzles 56,58. The lower deflectors 72 project inwardly from the lower, inner margin of each service opening directly into the stream of air issuing from each discharge nozzle 56,58 at an angle to the discharge stream such that the stream is deflected and directed generally inwardly, downwardly and away from the service opening 20,24. At the same time the lower deflectors 72 create zones of turbulent air in the lower corners of the bin upper compartment. The upper deflectors 74 project inwardly and downwardly from the upper, inner margin of each service opening at an angle to the plane of the service opening which is substantially the same as the angle formed between the lower deflector 72 and the plane of the service opening. The purpose of the upper deflectors 74 is to deflect away from the service openings 20,24 any portion of the heated air stream which, after entering and perhaps reflecting off the sides or top of the upper compartment, attempts to escape from the upper compartment 28 through the service openings 20,24. In so doing, the upper deflectors 74 create zones of turbulent air in the upper corners of the bin upper compartment above and outside the dome of warm, moist air enveloping the sandwiches.

In one practical embodiment of the invention, the upper and lower air deflectors comprise elongated metal strips about the length of the service opening width and bent along their short dimension to form an obtuse angled bracket 76, for example defining an included obtuse angle of about 120°. A first portion 76a of each bracket is desirably affixed, as by tack welding, to the upper and lower peripheral surfaces of each service opening 20,24 with the angled second portion 76b of each bracket extending inwardly into the upper compartment 28 of the bin. As is shown in FIG. 2, the inwardly extending second portion 76b of a bracket serving as an upper deflector 74 angles downwardly while the inwardly extending second portion 76b of a bracket serving as a lower deflector 72 angles upwardly. A portion of the heated, moist air in the upper compartment is continuously recycled and returned to the lower compartment 30 via the air flow passages 40 defined by gap 38 between spaced apart support members 36 and bin floor 26. This recycled air is humidified, drawn into and discharged from blowers 42,44, heated via heater means 60,62, accelerated through discharge nozzles 56,58 and returned thereby into upper compartment 28.

Figure 5:
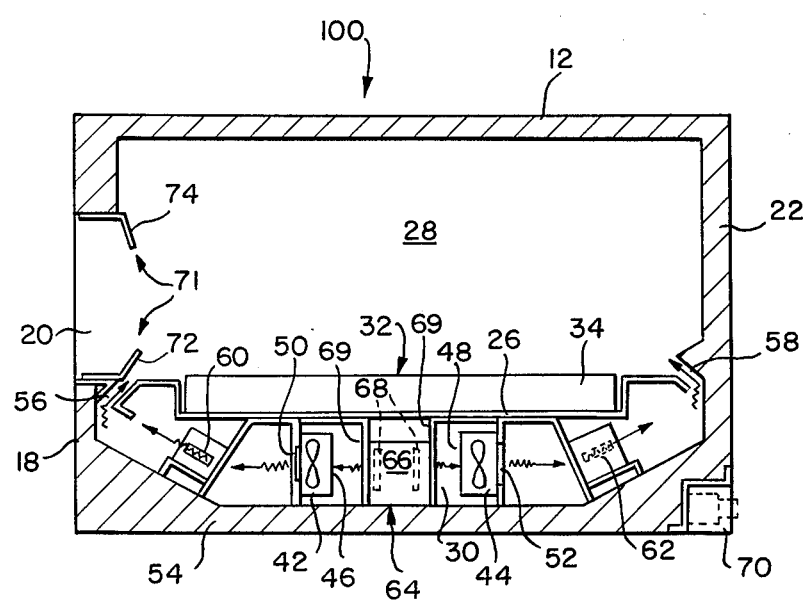
FIG. 5 is a longitudinal sectional view taken through another form of sandwich bin of the present invention having an always open front service opening.

It will, of course, be appreciated that not every service bin or application therefor requires front and rear service openings as is illustrated in connection with bin 10 of FIG. 2. For many bins a single front service opening is sufficient, in which case there would be no rear service opening and no opportunity for loss of heated, humidified air therethrough. Accordingly, as shown in FIG. 5, wherein like numbers designate like parts as in FIG. 2, such a bin, designated 100, would have no need for rear upper or lower deflectors and the upper and lower deflectors 72,74 illustrated in connection with front service opening 20 suffice to create the desired dome of heated, moist air and the aforementioned zones of turbulence in the corners of bin 100. It is also noteworthy, depending upon the nature of the sandwiches stored in the bin and their desired serving temperature and condition, that some bins may have no need for the air stream to be humidified. In such a case, humidifier means 64, including water pan 66 and immersion heaters 68, are optional and may be omitted.

We claim:

1. A heated, moist air sandwich bin for maintaining sandwiches therewithin sufficiently moist and at preselected elevated temperatures comprising:

a housing, said housing including a front wall, a rear wall, a top, a pair of opposite side walls and a floor, said front wall defining an open front service opening substantially across the width of the bin through which sandwiches may be inserted and withdrawn;

sandwich support means for storing sandwiches within said bin above said floor and below said service opening for easy access to the sandwiches through said service opening, said floor dividing said bin into an upper sandwich storage compartment and a lower compartment and defining with said side walls air flow passages for permitting heated, moist air in said upper compartment to flow into said lower compartment;

blower means in said lower compartment, air humidifier means in said lower compartment upstream of said blower means, air discharge nozzle means extending substantially across the width of and below said service opening for discharging a humidified air stream across said service opening into said upper compartment, duct means communicating said blower means with said air discharge nozzle means and air heater means in said duct means for heating the air to be discharged through said nozzle means, whereby said blower means forces air in said lower compartment through said duct means, across said air heater means and through said nozzle means into said upper compartment; and air directing means for creating a dome of moist heated air over the sandwiches in the bin positioned at said service opening and including air deflecting means located downstream of said air discharge nozzle means and extending into said upper compartment to intercept air discharging from said discharge nozzle means and to direct the flow of heated air discharging said nozzle means away from said service opening and into the housing to create and maintain said dome of heated moist air over the sandwiches in the bin while further creating turbulent zones of heated, moist air outside the dome for minimizing heated, moist air escape through said service opening.

2. A sandwich bin, as claimed in claim 1, wherein said air directing means comprise air directing vanes.

3. A sandwich bin, as claimed in claim 2, wherein said air directing vanes extend substantially across the width of said service opening.

4. A sandwich bin, as claimed in claim 3, including at least one upper and at least one lower air directing vane, said upper air directing vane extending into said upper compartment from the inner surface of said front wall substantially along the upper margin of said service opening and said lower air directing vane extending into said upper compartment from the inner surface of said front wall substantially along the lower margin of said service opening.

5. A sandwich bin, as claimed in claim 4, wherein said upper air directing vane extends inwardly and downwardly relative to the upper margin of said service opening and said lower air directing vane extends inwardly and upwardly relative to the lower margin of said service opening.

6. A sandwich bin, as claimed in claim 5, wherein the portion of each said air directing vane within said upper compartment forms an acute angle with the plane of said service opening.

7. A sandwich bin, as claimed in claim 6, wherein each said air directing vane comprises an elongated strip having a cross-section comprising first and second legs defining an obtuse angle therebetween.

8. A sandwich bin, as claimed in claim 7, wherein said first leg of said strip is affixed to the upper peripheral surface of said service opening and said second leg angles downwardly and inwardly into said upper compartment therefrom for forming said upper air directing vane.

9. A sandwich bin, as claimed in claim 8, wherein said first leg of said strip is affixed to the lower peripheral surface of said service opening and said second leg angles upwardly and inwardly into said upper compartment therefrom for forming said lower air directing vane.

10. A heated, moist air sandwich bin for maintaining sandwiches therewithin sufficiently moist and at preselected elevated temperatures comprising:
a housing, said housing including a front wall, a rear wall, a top, a pair of opposite side walls and a floor, said front and rear walls defining open front and rear service openings substantially across the width of the bin through which sandwiches may be inserted and withdrawn;
sandwich support means for storing sandwiches within said bin above said floor and below said service openings for easy access to the sandwiches through said service openings, said floor dividing said bin into an upper sandwich storage compartment and a lower compartment and defining with said side walls air flow passages for permitting heated, moist air in said upper compartment to flow into said lower compartment;
blower means in said lower compartment, air humidifier means in said lower compartment upstream of said blower means, air discharge nozzle means extending substantially across the width of and below said front and rear service openings for discharging a humidified air stream across each said service opening into said upper compartment, duct means communicating said blower means with said air discharge nozzle means and air heater means in said duct means for heating the air to be discharged through said nozzle means, whereby said blower means forces air in said lower compartment through said duct means, across said air heater means and through said front and rear nozzle means into said upper compartment; and
air directing means for creating a dome of moist heated air over the sandwiches in the bin positioned at said front and rear service openings and including air deflecting means located downstream of said air discharge nozzle means and extending into said upper compartment to intercept air discharging from said discharge nozzle means and to direct the flow of heated air discharging said front and rear nozzle means away from said service openings and into the housing to create and maintain said dome of heated, moist air over the sandwiches in the bin while further creating turbulent zones of heated, moist air outside the dome for minimizing heated, moist air escape through said service opening.

11. A sandwich bin, as claimed in claim 10, wherein said air directing means comprise air directing vanes.

12. A sandwich bin, as claimed in claim 11, wherein said air directing vanes extend substantially across the width of said front and rear service openings.

13. A sandwich bin, as claimed in claim 12, including at least one upper and at least one lower air directing vane, said upper air directing vane extending into said upper compartment from the inner surface of said front and rear walls substantially along the upper margins of said service openings and said lower air directing vane extending into said upper compartment from the inner surface of said front and rear walls substantially along the lower margins of said service openings.

14. A sandwich bin, as claimed in claim 13, wherein said upper air directing vane extends inwardly and downwardly relative to the upper margins of said service openings and said lower air directing vane extends inwardly and upwardly relative to the lower margins of said service openings.

15. A sandwich bin, as claimed in claim 14, wherein the portion of each said air directing vane within said upper compartment forms an acute angle with the plane of said service openings.

16. A sandwich bin, as claimed in claim 15, wherein each said air directing vane comprises an elongated strip having a cross-section comprising first and second legs defining an obtuse angle therebetween.

17. A sandwich bin, as claimed in claim 16, wherein said first leg of said strip is affixed to the upper peripheral surface of each said service opening and said second leg angles downwardly and inwardly into said upper compartment therefrom for forming said upper air directing vanes.

18. A sandwich bin, as claimed in claim 17, wherein said first leg of said strip is affixed to the lower peripheral surface of each said service opening and said second leg angles upwardly and inwardly into said upper compartment therefrom for forming said lower air directing vanes.

19. A heated moist air sandwich bin for maintaining sandwiches therewithin sufficiently moist and at preselected elevated temperatures comprising:
a housing, said housing including a front wall, a rear wall, a top, a pair of opposite side walls and a floor, said front wall defining an open front service opening substantially across the width of the bin through which sandwiches may be inserted and withdrawn;
sandwich support means for storing sandwiches within said bin above said floor and below said service opening for easy access to the sandwiches through said service opening, said floor dividing said bin into an upper sandwich storage compartment and a lower compartment;

blower means in said lower compartment, air humidifier means in said lower compartment positioned upstream of said blower means and operative to provide humidified air to said blower means, air discharge nozzle means extending substantially across the width of and below said service opening for discharging an air stream across said service opening into said upper compartment, duct means communicating said blower means and said humidifier means with said air discharge nozzle means, and air heater means in said duct means for heating the humidified air to be discharged through said nozzle means, said blower means operating to draw humidified air from said air humidifier means and to force said humidified air through said duct means, across said air heater means and through said nozzle means into said upper compartment; and air directing means positioned at said service opening for directing substantially all of the air discharging from said discharge nozzle means away from said service opening and into the interior of said housing to establish substantial air circulation within said housing.

20. The heated moist air sandwich bin of claim 19, wherein said air directing means operates to direct air from said discharge nozzle means away from said discharge opening and above said sandwich support means to create and maintain a dome of heated, moist air over sandwiches on said sandwich support means and to create turbulent zones of heated, moist air above said dome adjacent to the front wall of said housing to urge the moist heated airstream from said discharge nozzle means inwardly away from said surface opening.

* * * * *